W. H. WETMORE.
INKSTAND.
APPLICATION FILED JAN. 28, 1908.
909,491.
Patented Jan. 12, 1909.
2 SHEETS—SHEET 1.
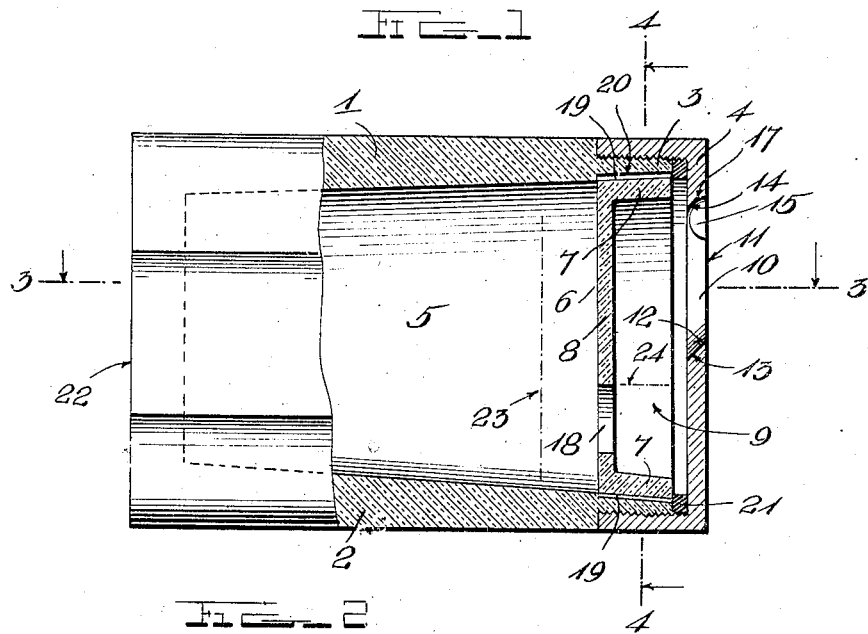
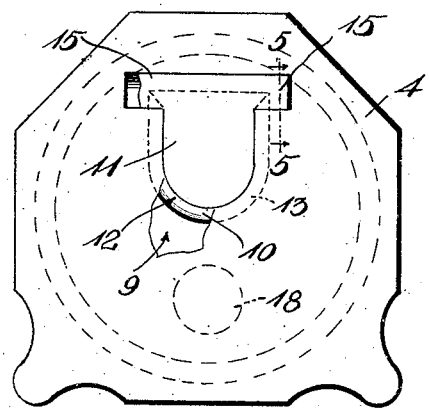
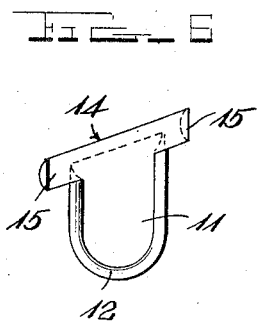
Witnesses
Inventor
W. H. Wetmore.

W. H. WETMORE.
INKSTAND.
APPLICATION FILED JAN. 28, 1908.
909,491.
Patented Jan. 12, 1909.
2 SHEETS—SHEET 2.
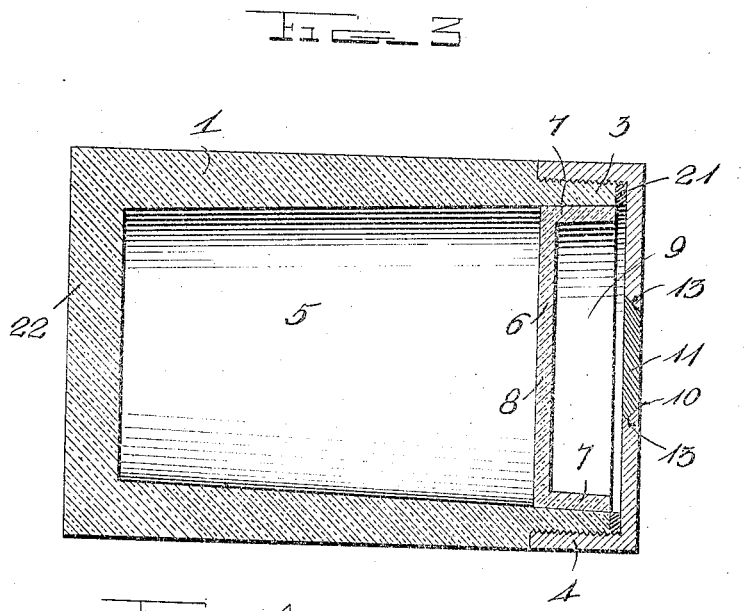
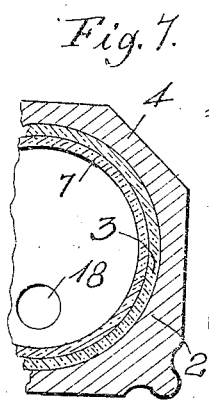
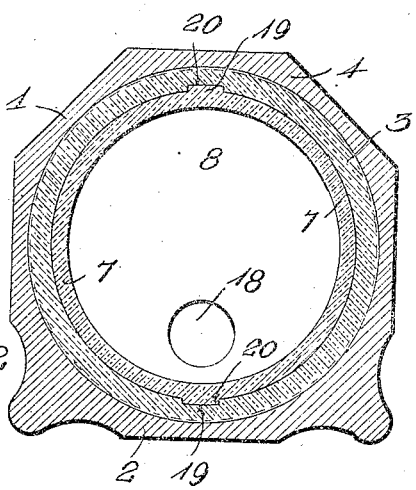
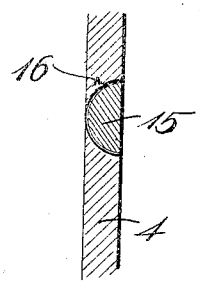
Witnesses
Inventor
W. H. Wetmore
By H. B. Willson &Co.
Attorneys

UNITED STATES PATENT OFFICE.

WILLIAM HALL WETMORE, OF GREENSBORO, NORTH CAROLINA.

INKSTAND.

No. 909,491.
Specification of Letters Patent.
Patented Jan. 12, 1909.

Application filed January 28, 1908. Serial No. 413,037.

*To all whom it may concern:*

Be it known that I, WILLIAM H. WETMORE, a citizen of the United States, residing at Greensboro, in the county of Guilford and State of North Carolina, have invented certain new and useful Improvements in Inkstands; and I do declare the following to be a full, clear, and exact description of the invention, such as will enable others skilled in the art to which it appertains to make and use the same.

This invention relates to barometer ink stands, and has for its object to provide an ink stand of this kind which will be economical and efficient in operation, which may be easily and cheaply manufactured, and which will present a sightly appearance.

For this and other objects my invention consists of certain novel combinations of parts of which the herein described ink stand is an embodiment.

While herein I have mentioned minute details I do not limit myself to these as the same may be greatly varied without departing from the spirit of the invention.

In the drawings, Figure 1 is a longitudinal vertical sectional view of my improved ink stand parts being shown in elevation, Fig. 2 is an end view a portion being broken away for convenience of illustration, Fig. 3 is a sectional view taken on the line 3—3 of Fig. 1, Fig. 4 is a sectional view taken on the line 4—4 of Fig. 1, Fig. 5 is an enlarged sectional view taken on the line 5—5 of Fig. 2, and Fig. 6 is a detail perspective view of the swinging door. Fig. 7 is a fragmentary sectional view showing a slightly modified construction.

As shown my improved ink stand comprises a glass body portion 1, provided with a base 2 and a reduced threaded open end 3, on which is screwed a cap 4. The cap 4 is of the same general shape as the body portion 1, and with said body portion forms a neat appearing ink stand, as shown. The body portion 1 is provided on the inside with the tapering reservoir 5, in the mouth of which is closely fitting a glass cup or stopper 6 contacting parts being ground to form a water tight seal or a rubber washer may be placed between the contacting parts. The cup 6 is provided with outstanding flanges 7 and the plate like body portion 8. Said body portion forming a partition which divides the ink stand into the reservoir 5 and a pen receiving space 9. The cap 4 is provided with an opening 10, fitted with a shutter 11 through which the pen may be thrust into the space 9. Said shutter is beveled inwardly, as shown at 12, and when in closed position pressed against the oppositely disposed bevel 13. At the edge of the opening 10 the upper edge of the shutter 11 is inwardly rounded as at 14, said edge being extended into laterally projecting arms 15, which are rounded on its upper and lower inner sides as clearly shown in Fig. 5. At the upper corners of the opening 10 is provided a rounded bearing seat 16, (see Fig. 5), the same being curved inwardly to hold the arms 15 against inward movement. The upper edge 17 of the opening 10 is curved to correspond with the curved upper edge 14. The bevel 13 is projected outwardly thereby holding the body portion against outward movement, the shutter being inserted through the seat 16 when the cap 4 is removed from the body portion 1, and cannot be removed when the cap 4 is screwed in place as the space 9 does not permit of sufficient swinging movement. The portion 8 of the cup is provided near its lower side with an opening 18 connecting the reservoir 5 with the space 9.

The outside face of the flange 7 may be provided with oppositely disposed tongues 19 adapted to be received by correspondingly shaped grooves 20 in the body portion 1. The object of this tongue groove connection is to hold the cup or stopper 6 against rotation in the reservoir 5. However if preferable, these tongues and grooves may be omitted to permit the cup 6 to be rotated in its seat whereby the height of the opening 18 may be adjusted to regulate the amount of ink in the space 9. If desired a packing ring or the like 21 may be provided at the outer edge of the reservoir 5, to make a tight joint between the body portion 1 and the inner part of the cap 4.

The operation of my device is as follows: The body portion 1 is stood up upon the end 22, and ink poured to fill it about even with the mark 23, the cup 6 is then put in place and the cap 4 screwed on, the shutter 11 having been previously inserted in place. The stand is then turned down upon the base, and the ink rises to the level shown at 24. As the shutter opens inwardly the pen may be forced against the outside side of said shutter and into the ink in the space 9.

The body portion 1 may be made of glass or any suitable material, while the cap 4 may be made of hard rubber, or some similar material such as "kornit" or glass.

Having thus described my invention what I claim is:

1. In combination a reservoir having an open side, a cap screwed over said open side and a wall spaced from said cap independently secured in said open side, said wall and said cap each being provided with a single opening respectively.

2. In combination a reservoir having an open side, a cap screwed over said open side and a wall spaced from said cap independently secured in said open side, said wall and said cap each being provided with a single opening respectively, the highest point of the opening in said wall being lower than the lowest point of the opening in said cap.

3. In combination a reservoir having an open side, a cap provided with an opening screwed over said open side and a wall spaced from said cap independently secured in said open side, and a closure for the opening in said cap.

4. In combination a reservoir having an open side, said side of said reservoir being reduced and provided with screw threads on the outside thereof, a screw cap secured over said threads, said cap having an opening therein and a cup secured in said open side, the body portion of said cup being provided with an opening, the lowest point of said first named opening being above the level of the highest point of said last named opening, the body of said cup being spaced from said cap whereby is formed an ink space between said body and said cap for the insertion of a writing pen.

5. In an ink well, a reservoir having an open side, a cap to close said side, said cap having an opening, and a cup rotatably secured in the open side of said reservoir and spaced from said cap, said cup having an opening located in a plane below the opening in said cap, substantially as described.

In testimony whereof I have hereunto set my hand in presence of two subscribing witnesses.

WILLIAM HALL WETMORE.

Witnesses:
S. M. ASKINS, Jr.,
C. A. HOLT.